United States Patent [19]

Esau et al.

[11] Patent Number: 4,604,858
[45] Date of Patent: Aug. 12, 1986

[54] PLUNGER CLEANOUT APPARATUS FOR UNDERFED CROP BALER

[75] Inventors: Edward W. Esau; Howard J. Ratzlaff, both of Hesston, Kans.

[73] Assignee: Hesston Corporation, Hesston, Kans.

[21] Appl. No.: 620,963

[22] Filed: Jun. 15, 1984

[51] Int. Cl.$^4$ ............................................. A01D 39/00
[52] U.S. Cl. .................................. 56/341; 100/19 R; 100/179
[58] Field of Search .................... 56/341, 343, 344; 100/179, 188 R, 189, 19, 24, 112

[56] References Cited

U.S. PATENT DOCUMENTS

| 4,275,550 | 6/1981 | Swenson et al. | 56/341 |
| 4,372,104 | 2/1982 | Simonis et al. | 100/189 |
| 4,375,786 | 3/1983 | Oosterling et al. | 56/341 |

FOREIGN PATENT DOCUMENTS 1800498  2/1980  Fed. Rep. of Germany ........ 56/341

Primary Examiner—John J. Wilson
Assistant Examiner—John G. Weiss
Attorney, Agent, or Firm—Schmidt, Johnson, Hovey & Williams

[57] ABSTRACT

The reciprocating plunger of the baler has needle slots in its crop-engaging face from which accumulating crop materials are ejected during each retraction stroke of the plunger by stationary, horizontally extending probes telestationary, horizontally extending probes telescopically received by the plunger. Consequently, the slots are maintained clear of any debris which would otherwise interfere with the smooth, trouble-free operation of tying needles of the baler as they periodically sweep across the bale chamber and through the needle slots at certain, preselected intervals in the baling cycle. The crop expelling probes are hollow and open along their lowermost extremities to permit the admission thereinto without interference of crop feeding fingers which introduce successive charges of crop materials up into the bale chamber from a loading duct below the latter in timed relationship with reciprocation of the plunger.

9 Claims, 4 Drawing Figures

PLUNGER CLEANOUT APPARATUS FOR UNDERFED CROP BALER

TECHNICAL FIELD

This invention relates to crop balers of the reciprocating plunger type and, more particularly, to improvements for ejecting or expelling materials that tend to become wedged within needle clearance slots in such plungers so that the needles of the baler are free to periodically sweep in an unobstructed manner up through such slots and present binding twine or the like to knotting mechanism on the opposite side of the bale chamber of the machine.

BACKGROUND

It is conventional to provide clearance slots for the tying needles of balers as aforesaid. However, particularly in an underfed baler of the type shown and described in co-pending application Ser. No. 06/611,824, filed May 18, 1984 in the name of Howard Ratzlaff, titled UNDERFED CROP BALER HAVING SINGLE ROTARY FEEDER, and assigned to the assignee of the present invention, such slots may at times become clogged with crop material and impede the needles as they attempt to move through the slots to present twine to the knotter. In severe cases, the wedged-in material may be sufficient not only to bend the needles or deflect them away from the knotter, but also to cause breakage thereof or shearing of a drive bolt associated therewith.

SUMMARY OF THE PRESENT INVENTION

Accordingly, one important object of the present invention is to provide a means for maintaining the slots of the plunger free and clear of materials that would tend to become clogged and wedged within such slots, thereby avoiding damage to or malfunction of the tying needles and knotter mechanism.

In carrying out this object, the present invention contemplates providing a stationary, fore-and-aft extending probe within the bale case for each plunger slot, which probe is telescopically received within the plunger during each retraction of the latter so as to effectively push, prod, and poke any loose materials from the plunger that would otherwise seek to collect within the clearance slots. In order to avoid interference with feed fingers which sweep upwardly through a portion of the slots, the probes are each made hollow and open along their lowermost extremities to permit passage of the moving fingers up into the probes and thence through and along the same before completing their rotation and sweeping down out of the bale chamber to engage the next charge of hay to be loaded up into the chamber. With the cleanout probes positioned forwardly of the opening through which the charges of material are delivered to the bale chamber and the twine needles disposed rearwardly of such opening there is no interference between such two structures, and each performs its own respective function without obstruction by the other.

DETAILED DESCRIPTION

The baler of the present invention includes a long, generally horizontally extending bale chamber 10 of rectangular cross-sectional configuration which is mounted on ground wheels 12 (one only being shown) for advancement along a path of travel as determined by a towing vehicle (not shown) connected to the front end of a tongue 14 which projects forwardly from the bale chamber 10. As is apparent, the chamber 10 has its longitudinal axis lying in a fore-and-aft direction with respect to the normal path of travel of the baler.

Figure 1:
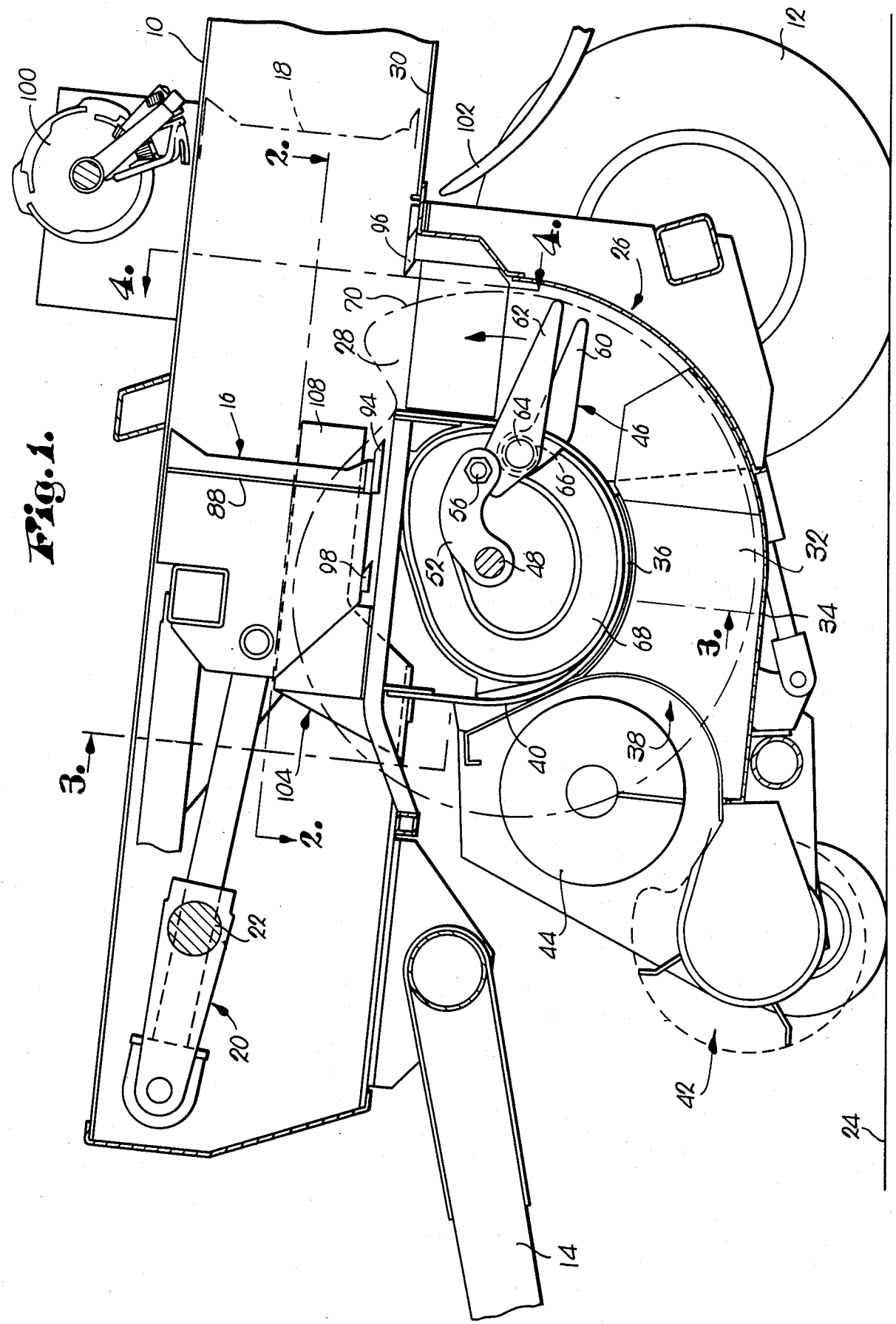
FIG. 1 is a fragmentary, vertical, fore-and-aft cross-sectional view of a baler constructed in accordance with the principles of the present invention.
Figure 2:
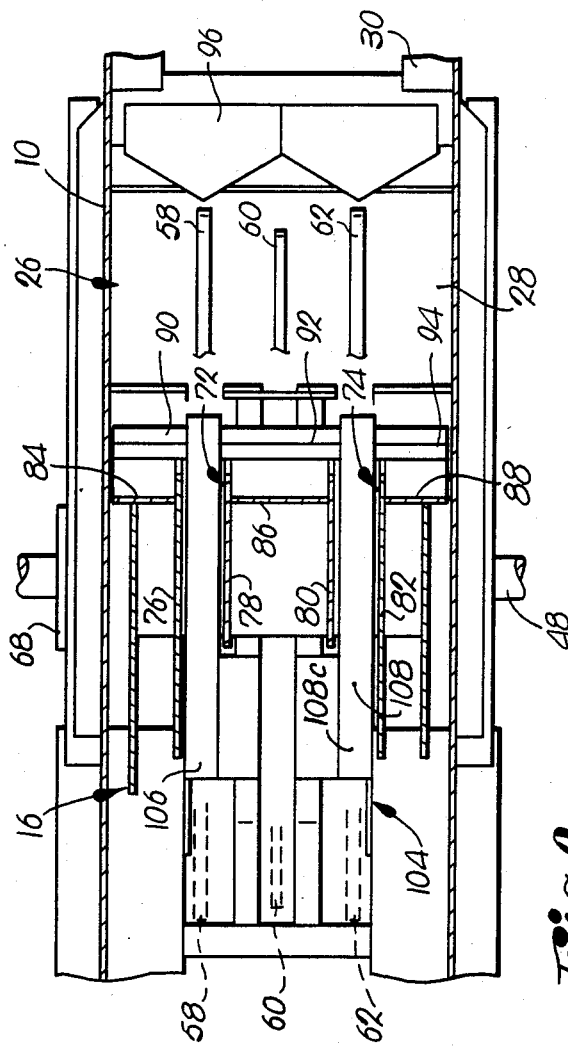
FIG. 2 is a fragmentary, horizontal cross-sectional view of the baler taken generally along line 2—2 of FIG. 1.
Figure 4:
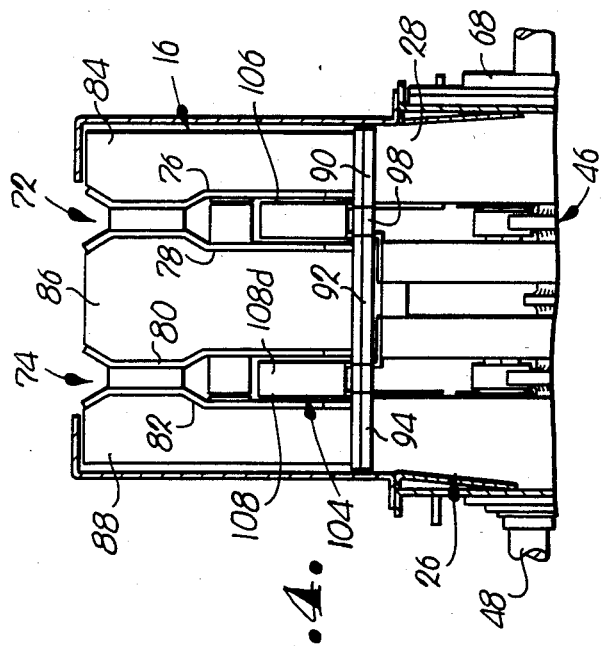
Figure 3:
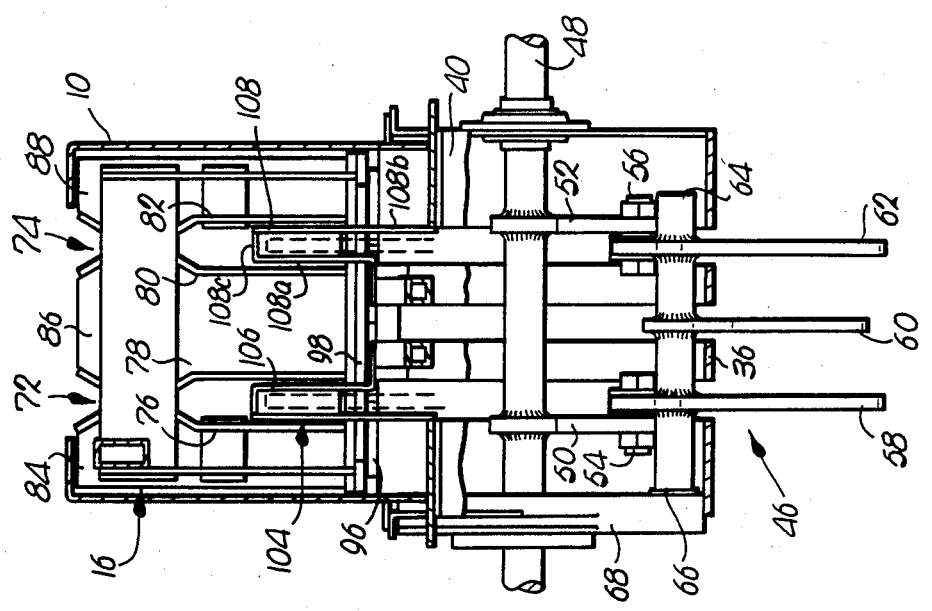
FIG. 3 is a generally vertical, transverse cross-sectional view of the baler taken generally along line 3—3 of FIG. 1 with the feeding fingers rotated into a down position in contrast to the position of FIG. 1; and, FIG. 4 is a fragmentary, transverse cross-sectional view of the baler taken generally along line 4—4 of FIG. 1.

A plunger 16 is housed within the chamber 10 for reciprocation in a fore-and-aft direction between a full forward, retracted position shown in solid lines in FIG. 1 and a full rearward extended position denoted by the phantom lines 18 in that same figure. A pitman and crank assembly 20 pivotally coupled with the plunger 16 and fixed to a main transverse drive shaft 22 across the forward end of the bale chamber 10 is operable to drive the plunger 16 in its reciprocating motion.

The bale chamber 10 is spaced above the ground 24 and has a long, tubular loading duct 26 depending therefrom through which crop materials can be conveyed to the bale chamber 10. The duct 26 is at least as long as the chamber is tall, and preferably has a length which is on the order of twice the height of chamber 10. A rectangular opening 28 in the bottom wall or floor 30 of chamber 10 communicates directly with the open upper end of the duct 26 for admitting crop materials into the chamber 10. As illustrated in FIG. 1, the plunger 16 moves back and forth across the opening 28 during its reciprocation.

The duct 26 is generally rectangular in cross section, having a pair of opposite side walls 32 (only one being shown), a curved bottom wall 34, and a curved, slotted top wall 36. The walls 32 and 34 terminate at their forward ends in an open entry mouth 38 which is slightly wider than the bale chamber 10 as a result of a laterally outward flare being imparted to the duct 26 as the mouth 38 thereof is approached. A frontmost wrapper 40 curves upwardly and forwardly from the mouth 38 as a slotted continuation of the top wall 36 to join with the bottom of the bale chamber 10.

A crop pickup 42 is spaced forwardly from the mouth 38 generally below the latter and extends transversely outwardly in opposite directions beyond the lateral confines of the duct 26. Auger mechanism 44 is disposed immediately rearwardly of the pickup 42 for the purpose of conveying crop materials from the outer, lateral reaches of the pickup 42 into the center of the machine in alignment with the mouth 38.

A single rotary feeder broadly denoted by the numeral 46 is positioned generally above the duct 26 and below the bale chamber 10 in disposition for taking materials from the auger mechanism 44 and sweeping the same up through the duct 26 and into the bale chamber 10 in timed relationship with reciprocation of the plunger 16. Such feeder 46 includes a transverse shaft 48 spanning the bale chamber 10 below the latter and continuously driven about its longitudinal axis during operation of the baler by means not shown but well understood by those skilled in the art. Affixed to the shaft 48 at two spaced-apart locations along the latter are curved cranks 50 and 52 connected at their outer ends by pivotal couplings 54 and 56 to a set of three crop-engaging fingers 58, 60, and 62. The fingers 58, 60, and 62 are all rigidly attached to a common crossbar 64 having a cam follower 66 at one end thereof riding within a cam track 68 on the corresponding interior sidewall of the baler. The three fingers 58, 60, and 62 are disposed to project through the slots in wrapper 40 and the corresponding slots in the top wall 36 of duct 26 during operation, the center finger 60 of the three being set back slightly from the other two fingers 58, 62 in a trailing sense and being slightly shorter than such fingers 58, 60. As a result of the interaction between the cam follower 66 and the cam track 68, those structures serve as mechanism for causing the fingers 58, 60, and 62 to travel along a course of travel denoted generally by the numeral 70 during operation.

The plunger 16 has a pair of vertical slots 72 and 74 passing entirely through the rear, crop-engaging portion thereof and extending forwardly therefrom along the bottom of the plunger 16. Slot 72 is defined by a pair of upright fore-and-aft plates 76, 78, and slot 74 is defined by a second pair of upright, fore-and-aft plates 80, 82. Transverse plates 84, 86, and 88 on opposite sides of slots 72, 74 define the crop-engaging face of the plunger 16.

The slots 72, 74 are aligned with the two fingers 58 and 62 so as to clear the latter during a portion of the baler operating cycle as will be discussed below. Three short knife sections 90, 92, and 94 are located at the base of the plunger 16 along its rearmost edge on opposite sides of the slots 72, 74 for cooperating with a stationary knife means 96 located along the rear extremity of the opening 28. A continuous knife 98 extends across the bottom of the plunger 16 at the forward terminations of the slots 72, 74 for likewise cooperating with the stationary knife means 96 during movement of the plunger 16 across the opening 28.

The baler is also provided with appropriate knotter or wire-tying mechanism 100 for binding a bale after formation within the chamber 10. It will be appreciated in this respect that such mechanism may include a set of knotting needles 102 which are normally maintained below the bale chamber 10 awaiting periodic actuation, at which time they swing upwardly through the bale chamber 10 and the slots 72, 74 in the plunger 16 to present a strand of twine or wire to the knotter 100 and loop the strand around the formed bale.

Apparatus broadly denoted by the numeral 104 is located within the bale chamber 10 for maintaining the slots 72, 74 free and clear of crop materials that would tend to impede the proper operation of the needles 102 and the knotter 100. In this respect, the apparatus 104 includes a pair of elongated, fore-and-aft extending, identical probes 106 and 108 disposed in alignment with the slots 72, 74 for telescopic reception within the latter during retraction and extension of the plunger 16. The probes 106, 108 are fixed to the bale chamber 10 so as to be stationary throughout operation of the baler, and each of the probes 106, 108 is hollow, having an open lower extremity permitting passage of the corresponding feeder finger 58, 62 upwardly into, through, and along the same during each rotation cycle of the feeder 46.

Taking the probe 108 as an example of the construction for both probes 106, 108, it will be seen that the probe 108 has a pair of laterally spaced sidewalls 108a and 108b, a top wall 108c, and a rearmost end wall 108d adjacent the forward extremity of the inlet opening 28. The probe 108 is cantilever mounted at its forward end to the bale chamber 10 by down-turned portions of the opposite sidewalls 108a and 108b, such portions being disposed generally forwardly beyond the forwardmost extremity of the plunger 16 when the latter is forwardly retracted as shown in FIG. 1. The primary, fore-and-aft working portion of the probe 108 has its lowermost extremity spaced above the floor 30 of the bale chamber 10 as illustrated in FIG. 1, and the continuous knife 98 is slung underneath such portion of the probe 108 traversing the entire width of the plunger 16.

OPERATION

As the baler is towed along its path of travel, the plunger 16 reciprocates continuously within the bale chamber 10 back and forth across the opening 28 to pack successive charges of material introduced from the duct 26 against previously compacted materials located in the bale chamber 10. As will be well understood by those skilled in the art, the baler operates in the nature of an extrusion-type baler in which a rearmost discharge opening of the bale chamber 10 is constricted with respect to portions upstream therefrom so as to induce a resistance to the rearward movement of baled materials through the chamber 10, thereby causing compaction of each new charge of material as it is shoved rearwardly by the plunger 16 during its compaction stroke. Although not shown in the drawings, it will also be understood by those skilled in the art that suitable retaining hay dogs or the like are used in connection with the bale chamber 10 for holding a freshly compacted charge of materials against retrograde, forward movement after being pressed rearwardly by the plunger 16 across the opening 28.

As the baler advances, crop materials are lifted off the ground by the pickup 42, are center-gathered by the auger mechanism 44, and are swept in successive charges rearwardly and upwardly through the duct 26 and into the bale chamber 10 by the feeder 46, which is rotating in a counterclockwise direction viewing FIG. 1. As illustrated in FIG. 1, the fingers 58, 62 of feeder 46 move during their 360 degrees of rotation along the course of travel 70, which includes a short initial penetration up into the chamber 10 at the inlet 28, then a dip down below the rearwardly moving plunger 16 which effectively wipes the charge of material off the fingers 58, 62, and then a flip back up into the slots 72, 74 before rotating down and around once again to the mouth 38. It will be appreciated in this respect that since the knife sections 90, 92, and 94 are discontinuous across the lower rear edge of the plunger 16, the feeder fingers 58, 62 can enter the slots 72, 74 at the crop-engaging face of the plunger 16 without damage. However, inasmuch as the knife 98 is continuous and traverses the slots 72, 74, it is necessary for the fingers 58, 62 to dip down at the indicated portion of the course of travel 70 until knife 98 passes by, whereupon fingers 58, 62 are once again free to flip up into the bale chamber 10 on the forward side of the plunger 16.

It is to be noted that during the movement of fingers 58, 62 up into the bale chamber 10 forwardly of the inlet opening 28 such fingers 58, 62 are received up into the hollow, open-bottom probes 106, 108 to avoid contacting engagement between such structures. It will also be noted that because the probes 106, 108 are telescopically received within the plunger 16 during each retraction stroke of the latter, the probes 106, 108 effectively eject or expel any crop materials which may have tended to collect and wedge within the slots 72, 74. Such expelled material simply falls into the upper end of the duct 26 and thus becomes co-mingled with the next charge of materials brought up into the chamber 10 by the feeder 46.

As a result of the probes 106, 108, the slots 72, 74 are maintained free and clear of materials which might otherwise interfere with and impede the proper movement of the tying needles 102 upwardly through and across the bale chamber 10 when the forming bale has reached its desired length and the needles 102 have been actuated. Without clearing the slots 72, 74, it has been found that in some conditions the accumulation of materials within the slots 72, 74 can cause the needles 102 to be deflected sufficiently from their intended paths of travel as to miss properly presenting the twine or wire to the knotter 100, to be bent or in extreme cases even broken, or to be completely prevented from passing through the plunger 16 and thus cause the drive mechanism for the needles 102 to be sheared.

We claim:

1. In a crop baler having a baling chamber and a plunger reciprocable in said chamber through compaction and retraction strokes, the improvement comprising:
   means defining at least one clearance slot in the crop-engaging face of said plunger;
   structure movable through said slot during at least a portion of the operating cycle of the plunger;
   apparatus separate from said structure and insertable into the clearance slot during retraction of the plunger to remove obstructing crop materials therefrom in order to avoid interference of the crop materials with said structure when the latter is moved through the slot; and
   means mounting said apparatus for removal of said obstructing crop material from said slot and into said baling chamber in a direction opposite to the direction of movement of said plunger during retraction thereof.

2. In a crop baler as claimed in claim 1, said mounting means comprising means for stationary positioning of said apparatus relative to said plunger.

3. In a crop baler having a baling chamber and a plunger reciprocable in said chamber, the improvement comprising:
   means defining at least one clearance slot in the crop-engaging face of said plunger;
   structure movable through said slot during at least a portion of the operating cycle of the plunger; and
   apparatus for periodically removing obstructing crop materials from the clearance slot to avoid interference with said structure when the latter is moved therethrough,
   said apparatus including a stationary probe disposed in the path of travel of said plunger and in alignment with said slot for telescopic reception within the latter during the operating cycle of the plunger.

4. In a crop baler as claimed in claim 3, wherein said structure includes a needle comprising part of a mechanism for binding bales produced by the baler.

5. In a crop baler as claimed in claim 3, wherein said structure includes a feeder operable to load crop materials into the chamber for compaction by the plunger.

6. In a crop baler as claimed in claim 5, wherein said probe is hollow, having an open extremity facing said feeder so as to receive and clear the latter during said movement of the feeder into the slot.

7. In a crop baler:
   a generally horizontally disposed baling chamber having an inlet opening in a lower wall thereof;
   a plunger reciprocable within said chamber across said opening;
   a tubular duct depending from said chamber with its upper end in direct communication with said opening;
   means for feeding successive charges of crop materials through said duct and into said chamber in timed relation to reciprocation of the plunger,
   said plunger having a crop-engaging face provided with a plurality of generally vertically extending, laterally spaced slots and a bottom face provided with fore-and-aft continuations of said slots,
   said feeding means including a pair of crop-engaging fingers projecting up into the chamber and movable through said slots during each compaction stoke of the plunger;
   a pair of needles normally disposed in a standby position below said chamber and operable periodically to sweep upwardly across the chamber rearwardly of said opening for presenting strands of binding element to mechanism for securing the strands around a completed bale,
   said needles when operated being disposed to pass upwardly through said slots during a compaction stroke of the plunger; and
   stationary apparatus disposed in said chamber for ejecting accumulated crop materials from said slots,
   said apparatus including a pair of fore-and-aft extending probes located forwardly of said opening for telescopic penetration into and through the slots during each retraction stroke of the plunger,
   said probes being disposed to avoid contacting engagement with said fingers as the latter move through said slots during each compaction stroke of the plunger.

8. In a crop baler as claimed in claim 7, wherein each of said probes is hollow, having an open lower extremity permitting movement of the corresponding finger up into and along through the probe.

9. In a crop baler as claimed in claim 8, wherein said probes are cantilever-supported at forward ends thereof by said chamber and have said lower extermities spaced above said lower wall, said plunger having a continuous, transverse knife across the bottom thereof spanning said slots and slung under said probes for severing remnants of crop materials extending between the bale chamber and the duct.

* * * * *